US010549355B1

(12) United States Patent
Parker et al.

(10) Patent No.: US 10,549,355 B1
(45) Date of Patent: Feb. 4, 2020

(54) LUG NUT REMOVAL TOOL

(71) Applicants: Eric Wayne Parker, Redmond, WA (US); Ronald P. Broussard, Murrieta, CA (US)

(72) Inventors: Eric Wayne Parker, Redmond, WA (US); Ronald P. Broussard, Murrieta, CA (US)

( * ) Notice: Subject to any disclaimer, the term of this patent is extended or adjusted under 35 U.S.C. 154(b) by 0 days.

(21) Appl. No.: 15/364,664

(22) Filed: Nov. 30, 2016

Related U.S. Application Data

(63) Continuation-in-part of application No. 13/723,784, filed on Dec. 21, 2012.

(51) Int. Cl.
*B23B 51/00* (2006.01)
*B23B 51/04* (2006.01)
*B60B 29/00* (2006.01)
*B25B 27/18* (2006.01)

(52) U.S. Cl.
CPC ........ *B23B 51/0054* (2013.01); *B23B 51/042* (2013.01); *B23B 51/0406* (2013.01); *B23B 2215/08* (2013.01); *B23B 2231/28* (2013.01); *B23B 2250/12* (2013.01); *B25B 27/18* (2013.01); *B60B 29/00* (2013.01); *Y10T 279/17333* (2015.01); *Y10T 279/3493* (2015.01); *Y10T 408/568* (2015.01); *Y10T 408/893* (2015.01)

(58) Field of Classification Search
CPC .............. B23B 51/0406; B23B 51/042; B23B 51/0054; B23B 2231/28; B25B 27/18; B23D 29/007; Y10T 279/3493; Y10T 279/17333; Y10T 408/568; Y10T 408/569; Y10T 408/97; Y10T 408/5624; Y10T 408/567; Y10T 408/893; Y10T 408/56245
See application file for complete search history.

(56) References Cited

U.S. PATENT DOCUMENTS

| | | | | |
|---|---|---|---|---|
| 502,273 A * | 8/1893 | Bergmann | .............. | B23B 31/36 279/43.3 |
| 1,623,927 A * | 4/1927 | Lenhardt | ............. | B23B 51/0406 200/16 R |
| 1,664,677 A * | 4/1928 | Grebe | .................... | B21D 49/00 72/125 |
| 2,563,309 A * | 8/1951 | Collins, Sr. | ................ | B43L 9/18 279/43.3 |
| 2,836,888 A * | 6/1958 | Hargrove | ................. | B21J 15/50 29/275 |

(Continued)

FOREIGN PATENT DOCUMENTS

JP 06206111 A * 7/1994 ............. B23B 51/00

*Primary Examiner* — Eric A. Gates
(74) *Attorney, Agent, or Firm* — Gugliotta & Gugliotta LPA

(57) ABSTRACT

A lug nut removal tool enables a user to remove a seized lug nut from a threaded stud. The lug nut removal tool comprises a drill bit which is drilled through a guide which can be adjusted in size by a collar. The drill bit comprises a plurality of blades separated by slots; the plurality of blades are mechanically coupled to cutting edges. The guide comprises guide slots which can be used to align the guide about the seized lug nut. In this manner, the user can attach the guide onto the seized lug nut and tighten the guide with a set screw. Then the user can attach the drill bit onto an air drill to cutting edge out the seized lug nut.

14 Claims, 10 Drawing Sheets

(56) References Cited

U.S. PATENT DOCUMENTS

| | | | | |
|---|---|---|---|---|
| 2,942,500 A * | 6/1960 | Conner | B23B 49/023 | 408/16 |
| 3,439,456 A * | 4/1969 | Bailey | B24B 9/16 | 451/278 |
| 3,620,635 A * | 11/1971 | DalBianco | B23B 47/284 | 29/426.4 |
| 3,640,635 A * | 2/1972 | Von Hollen | B23B 45/001 | 173/217 |
| 3,735,650 A * | 5/1973 | Weng, Jr. | B25B 27/18 | 81/53.2 |
| 3,874,808 A * | 4/1975 | Zaccardelli | B23B 47/34 | 408/1 R |
| 3,913,427 A * | 10/1975 | Brase | B25B 27/18 | 81/53.2 |
| 4,035,100 A * | 7/1977 | Kruger | B23B 31/005 | 279/102 |
| 4,078,458 A * | 3/1978 | Berendzen | B23B 51/08 | 29/240 |
| 4,131,385 A * | 12/1978 | Narang | B23B 49/023 | 408/115 B |
| 4,188,722 A * | 2/1980 | Young | B25D 3/00 | 29/275 |
| 4,203,211 A * | 5/1980 | Quick | B26B 17/003 | 30/272.1 |
| 4,257,163 A * | 3/1981 | Bauer | B23D 15/14 | 29/252 |
| 4,365,413 A * | 12/1982 | Quick | B23D 29/007 | 29/426.4 |
| 4,572,035 A * | 2/1986 | Eisenhauer | B23D 29/007 | 29/426.5 |
| 4,664,394 A * | 5/1987 | Theissig | B23B 31/001 | 277/641 |
| 4,682,399 A * | 7/1987 | Heimbach | B23B 51/0426 | 29/426.4 |
| 4,708,039 A * | 11/1987 | Redman | B23B 13/123 | 279/23.1 |
| 4,759,666 A * | 7/1988 | Grab | B23B 47/28 | 408/115 B |
| 4,940,370 A * | 7/1990 | Gipson | B25B 27/18 | 29/802 |
| 5,056,965 A * | 10/1991 | Tsui | B23B 49/023 | 408/115 B |
| 5,078,605 A * | 1/1992 | Sutter | A61B 17/1644 | 408/59 |
| 5,213,456 A * | 5/1993 | Lee | B23B 51/0406 | 408/203.5 |
| 5,388,933 A * | 2/1995 | Dunbar | B23B 47/284 | 408/115 B |
| 5,401,125 A * | 3/1995 | Sevack | B23B 51/0406 | 408/203.5 |
| 5,403,132 A * | 4/1995 | Truesdell | B23B 31/202 | 279/145 |
| 5,544,987 A * | 8/1996 | Gipson | B25B 27/18 | 29/802 |
| 5,810,524 A * | 9/1998 | Wirth, Jr. | B23B 51/0406 | 408/203.5 |
| 5,820,314 A * | 10/1998 | Dunbar | B23B 47/28 | 408/72 B |
| 5,979,042 A * | 11/1999 | Duke | H05K 3/225 | 29/739 |
| 6,267,025 B1 * | 7/2001 | Sand | B25B 27/18 | 81/120 |
| 6,273,652 B1 * | 8/2001 | Wirth, Jr. | B23B 51/0406 | 408/203.5 |
| 6,330,738 B1 * | 12/2001 | Yoshikawa | B21J 15/50 | 29/426.4 |
| 6,585,459 B2 * | 7/2003 | Wirth, Jr. | B23B 51/0406 | 408/203.5 |
| 6,629,804 B1 * | 10/2003 | Rosenbaum | B23B 51/0406 | 408/112 |
| 6,761,514 B2 * | 7/2004 | Cirino | B23B 5/167 | 407/40 |
| 6,769,845 B2 * | 8/2004 | Estes | B21J 15/50 | 408/203.5 |
| 7,077,031 B1 * | 7/2006 | Frederiksen | B23P 19/069 | 81/177.5 |
| 7,134,251 B2 * | 11/2006 | Zurn | E06B 3/677 | 52/514 |
| 7,578,324 B2 * | 8/2009 | Cantlon | B23B 51/0426 | 144/136.95 |
| 7,594,455 B2 * | 9/2009 | Swanson | B25B 27/18 | 81/411 |
| 7,735,875 B2 * | 6/2010 | Jimenez | F16L 25/065 | 285/373 |
| 8,910,360 B1 * | 12/2014 | Keetle | B23B 51/0054 | 29/402.08 |
| 9,056,359 B1 * | 6/2015 | Clark | B23D 29/007 | |
| 2006/0090321 A1 * | 5/2006 | Haines, Jr. | B21J 15/50 | 29/426.4 |
| 2006/0186612 A1 * | 8/2006 | Puzio | B23B 31/06 | 279/62 |
| 2009/0214307 A1 * | 8/2009 | Nguyen | B23B 49/02 | 408/56 |

* cited by examiner

LUG NUT REMOVAL TOOL

RELATED APPLICATIONS

The present application is a Continuation in Part of U.S. Ser. No. 13/723,784, filed on Dec. 21, 2012 and incorporated by reference herein as if fully rewritten.

BACKGROUND OF THE INVENTION

1. Field of the Invention

This invention relates to tools that are commonly used for automobile maintenance and, more particularly, to a lug nut removal device for removing seized lug nuts from the wheel of a vehicle.

2. Description of the Related Art

A lug nut is a fastener, specifically a nut, used to secure a wheel on a vehicle. Typically, lug nuts are found on automobiles, trucks, and other large vehicles utilizing rubber tires. A lug nut is a nut with one rounded or conical (tapered) end, used on steel and most aluminum wheels. A set of lug nuts are typically used to secure a wheel to threaded wheel studs and thereby to a vehicle's axles. Some designs use lug bolts instead of nuts, which screw into a tapped (threaded) hole in the wheel's hub or brake drum or disc. This configuration is commonly known as a bolted joint.

The lug's taper is normally 60 degrees (although 45 is common for wheels designed for racing applications), and is designed to center the wheel accurately on the axle, and to reduce the tendency for the nut to loosen, due to fretting induced precession, as the car is driven. Honda uses a spherical rather than a tapered seat, but the nut performs the same function. Older style alloy wheels have a ½ to 1 inch shank slipping into the wheel to center it and a washer that applies pressure to clamp the wheel to the axle.

Lug nuts may be removed using a lug, socket or impact wrench. If the wheel is to be removed then an automotive jack to raise the vehicle and some wheel chocks would be used as well. Wheels that have hubcaps or hub covers need these removed beforehand, typically with a screwdriver, flatbar, or prybar. Lug nuts can be difficult to remove, as they may become seized to the wheel stud.

Prior to the disclosed invention, there was not tool that easily removed these seized lug nuts, rather repeated blows with an air chisel over a period of hours would be necessary to remove the seized lug nut. The present invention solves this problem

SUMMARY OF THE INVENTION

A lug nut removal tool is provided that enables a user to remove a seized lug nut from a threaded stud. The lug nut removal tool comprises a drill bit which is drilled through a guide which can be adjusted in size by a collar. The drill bit comprises a plurality of blades separated by slots; the plurality of blades is mechanically coupled to cutting edges. The guide comprises guide slots which can be used to align the guide about the seized lug nut. In this manner, the user can attach the guide onto the seized lug nut and tighten the guide with a set screw. Then the user can attach the drill bit onto an air drill to bore out the seized lug nut.

A method for removing a seized lug nut is also provide that comprises the following steps not necessarily in order. A user maneuvers a guide onto the seized lug nut. The user tightens the guide onto the seized lug nut. The user maneuvers a drill bit proximate the guide, where the drill bit is mechanically coupled to an air drill and the drill bit further comprises a plurality of blades separated by slots where the plurality of blades are mechanically coupled to cutting edges. The user engages the air drill in order to rotate the drill bit causing the cutting edges to tear a head off the seized lug nut. The user disengages the air drill and removing the guide, exposing the head from the seized lug nut. Finally, the user removes the head from the seized lug nut. After removing the head of the lug nut, the user reinstalls the guide and continues to drill out the threads until all the threads are drilled out. At this point the lug nut and stud threads have been drilled out, the lug nut and guide falls off of the rim.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Embodiments of the present invention overcome many of the obstacles associated with removing seized lug nuts from a threaded wheel stud, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Figure 1:
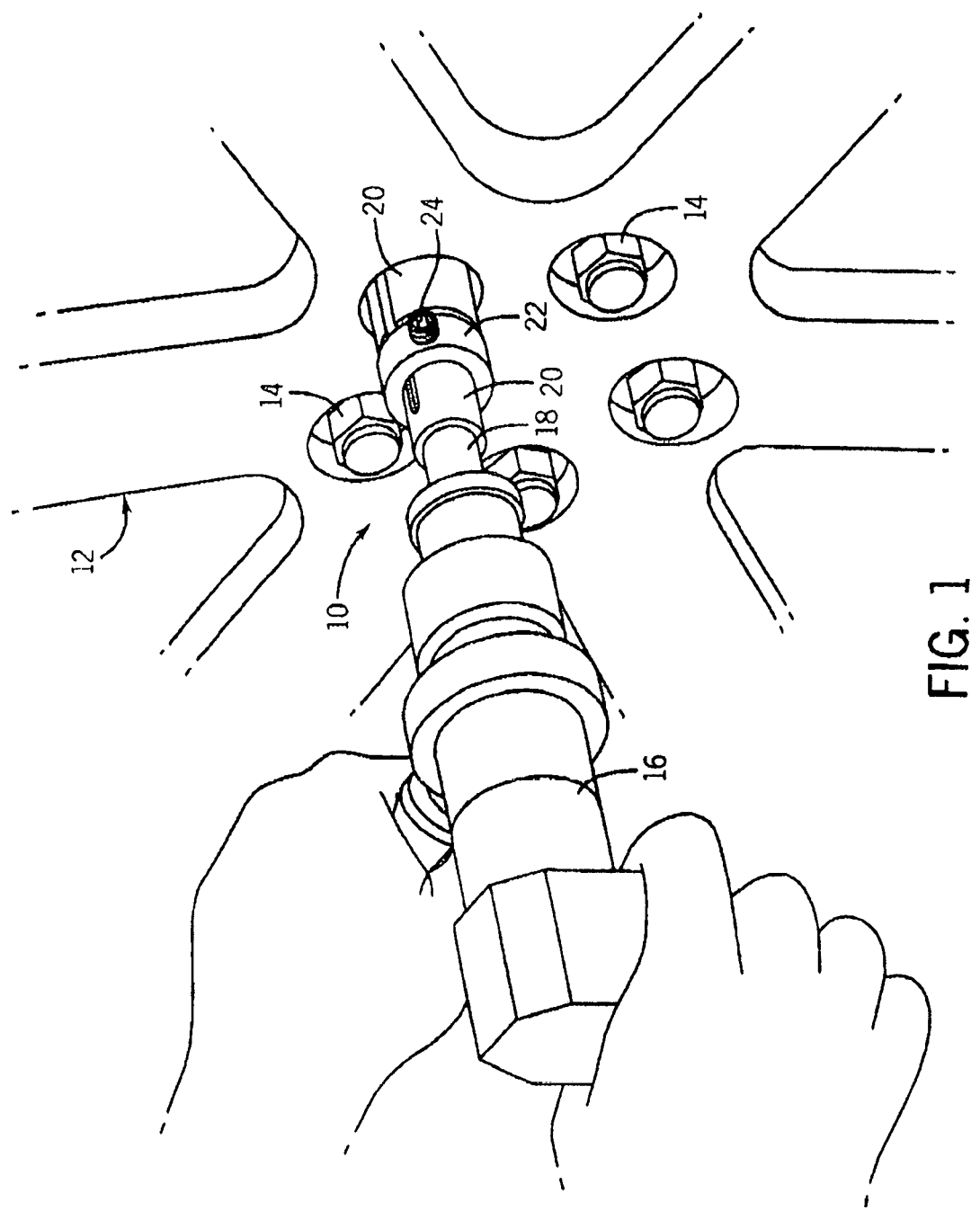
FIG. 1 is perspective view showing the invention in use.
Figure 2:
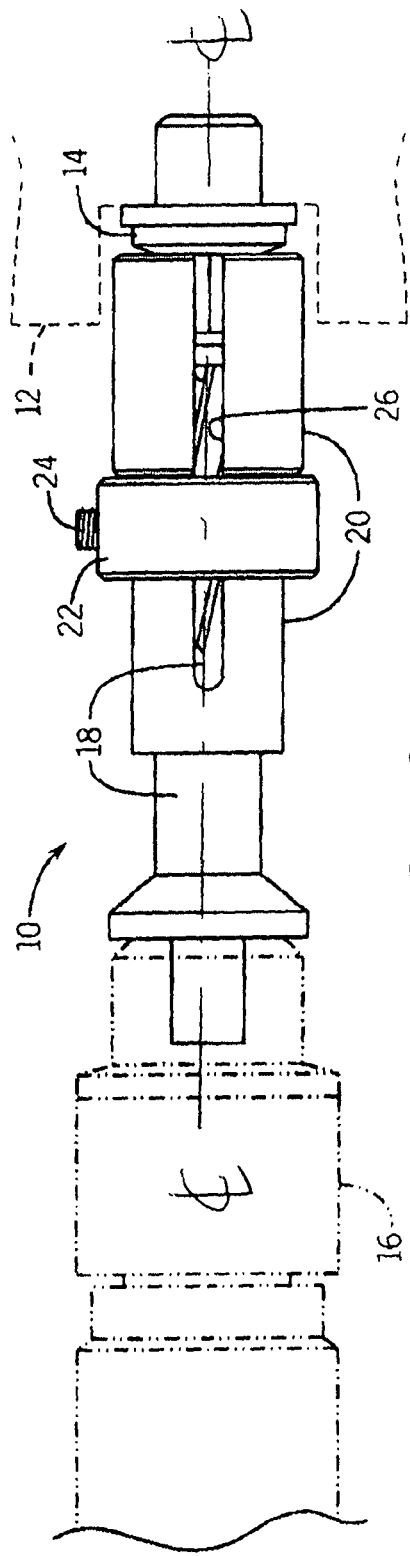
FIG. 2 is a side elevation view showing the invention in use.
Figure 3:
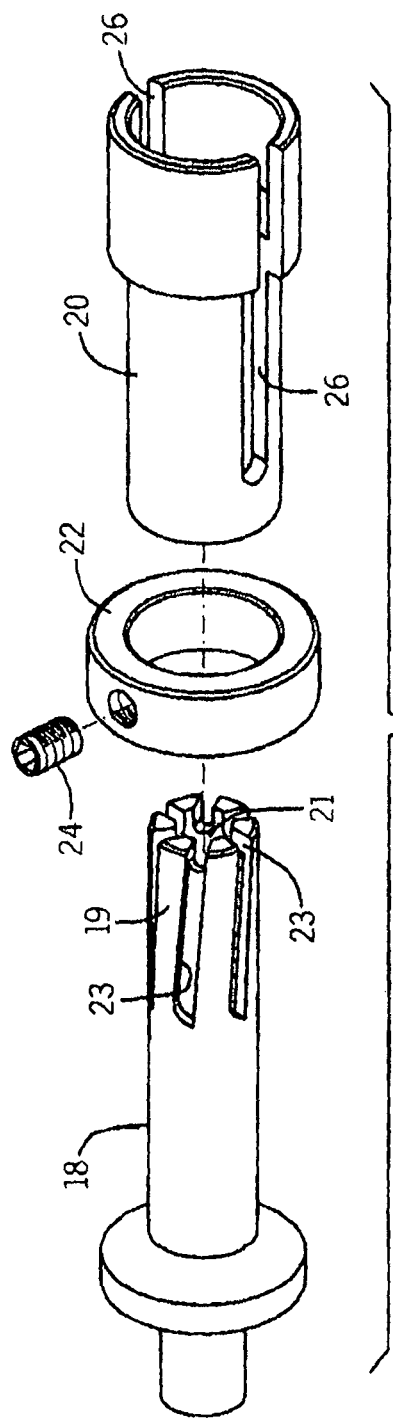
FIG. 3 is an exploded perspective view.

FIG. 1 shows the invention in use. A user desires to remove a seized lug nut 14 from a threaded stud (not shown) on wheel 12 without resorting to repeated blows from an air chisel. Lug nut removal tool 10 accomplishes this function. Lug nut removal tool 10 comprises a hollow drill bit 18 forming a cylindrical central cavity 17 which is linearly aligned along a linear centerline of and laterally drilled through an adjustable guide 20 which can be adjusted in radial size by a collar 22. FIG. 2 shows a detail view of this assembly. FIG. 3 shows an explosion view of this assembly and FIG. 4 shows a section view of this assembly.

Figure 4:
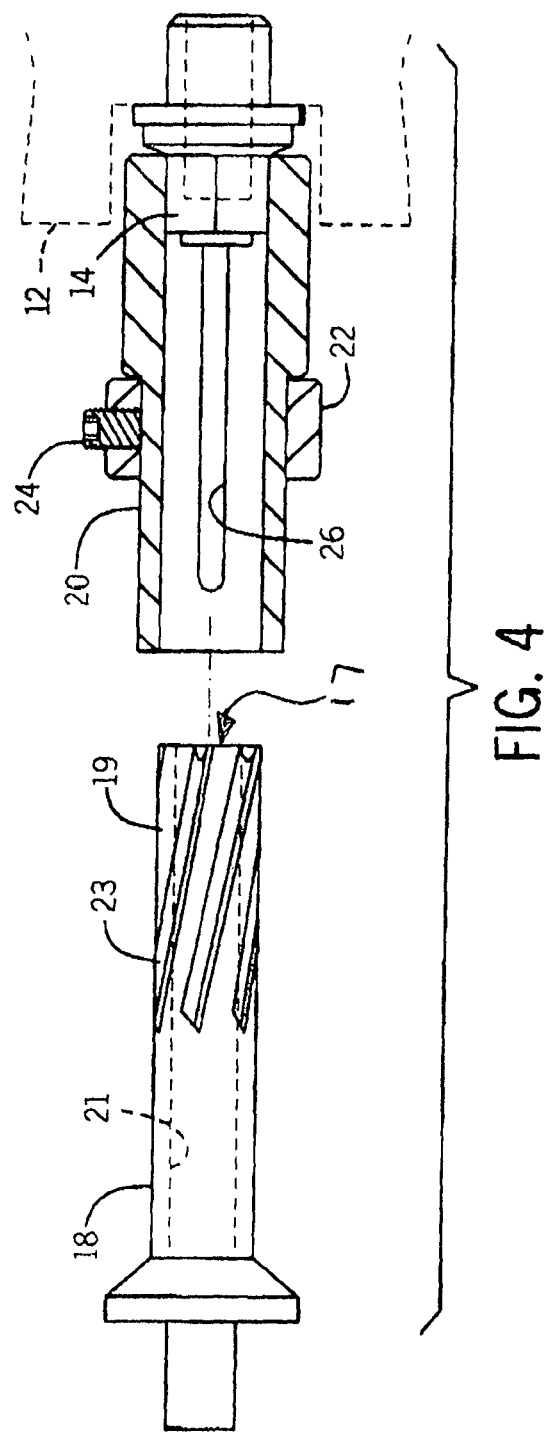
FIG. 4 is a side elevation view with parts shown in cross-section.
Figure 5:
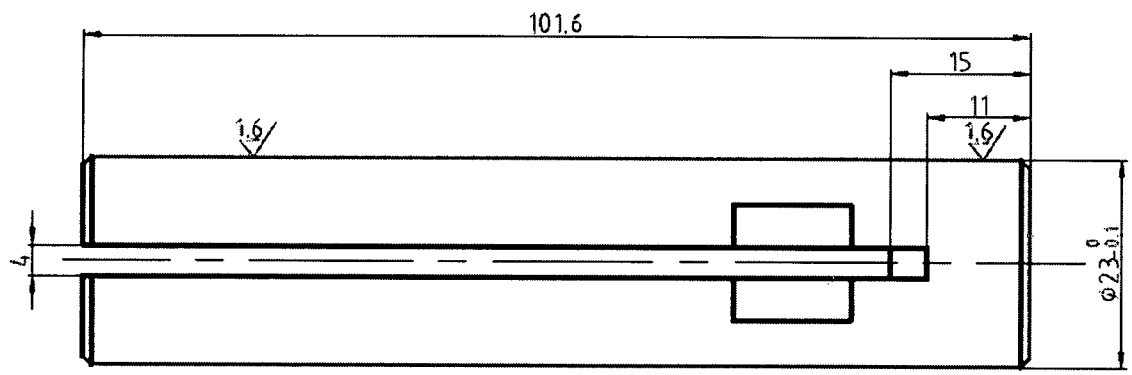
FIG. 5 is a side elevational view of an adjustable guide 20 for use with the preferred embodiment of the present invention according to a first design configuration.
Figure 6:
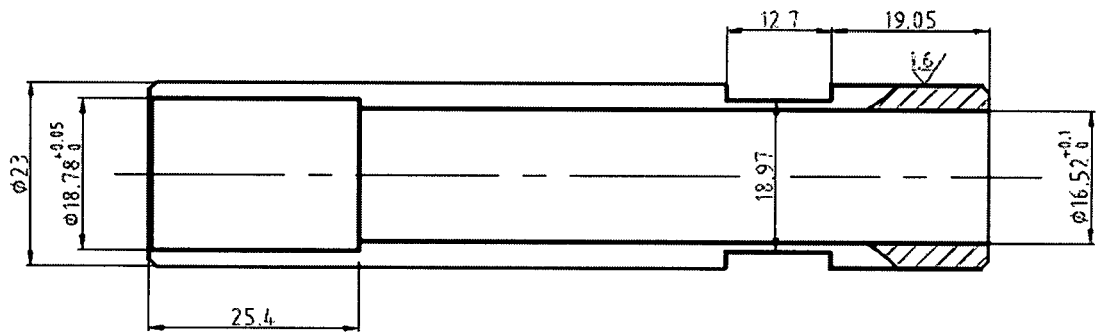
FIG. 6 is a cross sectional view of the guide of FIG. 5 taken along a linear centerline.
Figure 7:
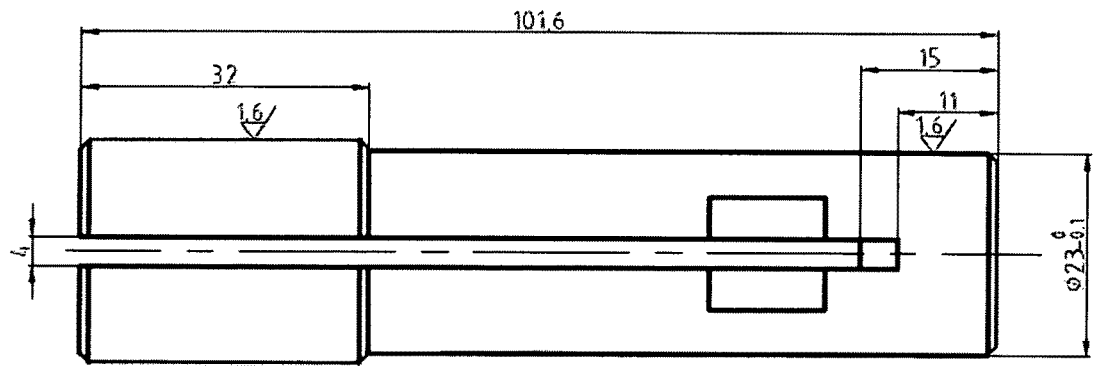
FIG. 7 is a side elevational view of an adjustable guide 20 for use with the preferred embodiment of the present invention according to a second design configuration.
Figure 8:
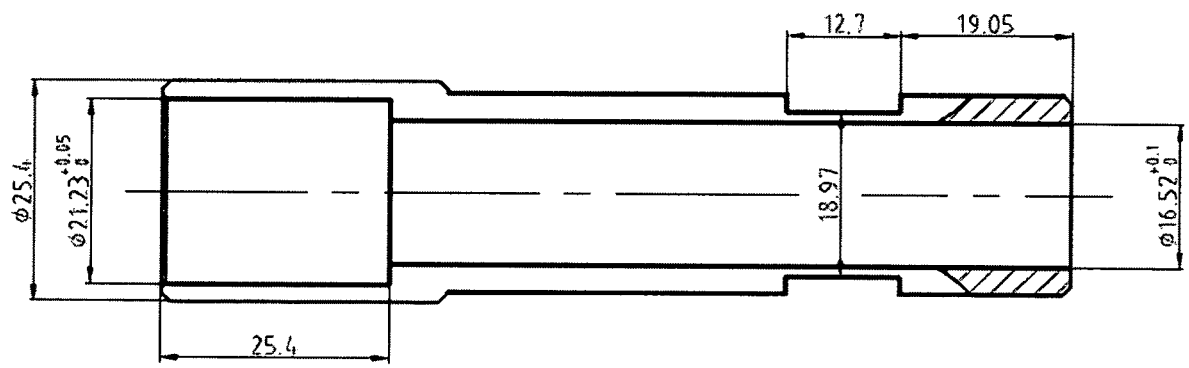
FIG. 8 is a cross sectional view of the guide of FIG. 7 taken along a linear centerline.
Figure 9:
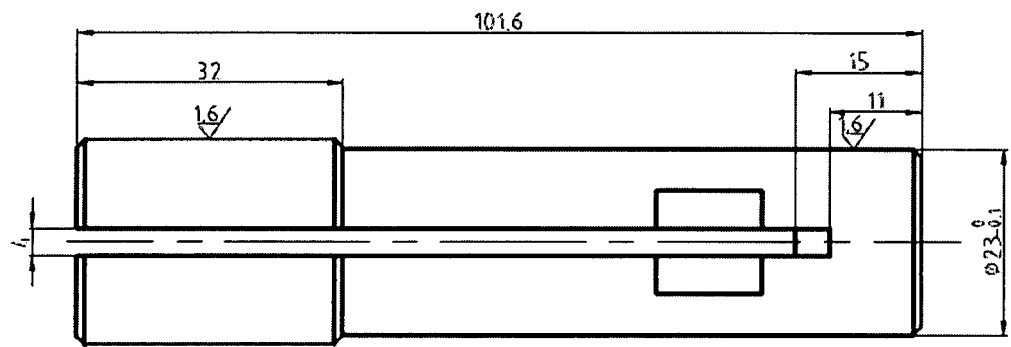
FIG. 9 is a side elevational view of an adjustable guide 20 for use with the preferred embodiment of the present invention according to a third design configuration.
Figure 10:
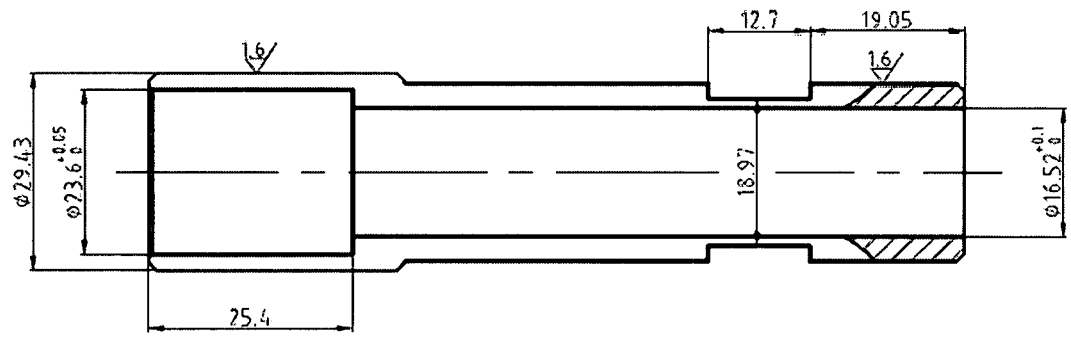
FIG. 10 is a cross sectional view of the guide of FIG. 9 taken along a linear centerline.
Figure 11:
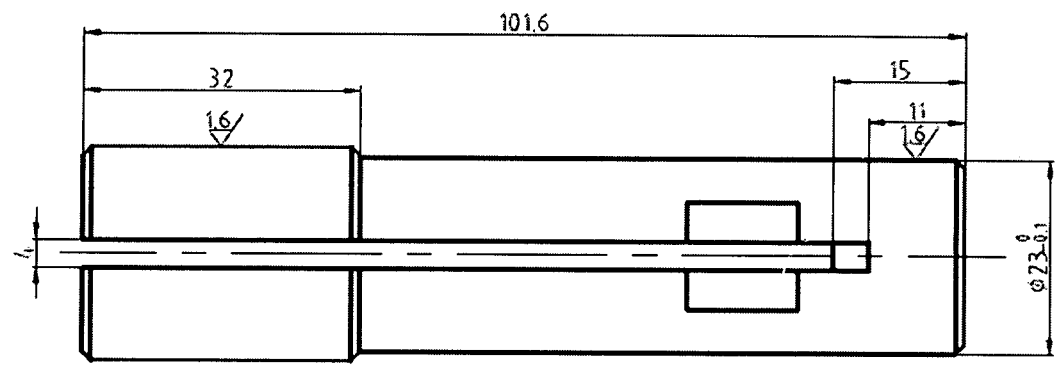
FIG. 11 is a side elevational view of an adjustable guide 20 for use with the preferred embodiment of the present invention according to a fourth design configuration.
Figure 12:
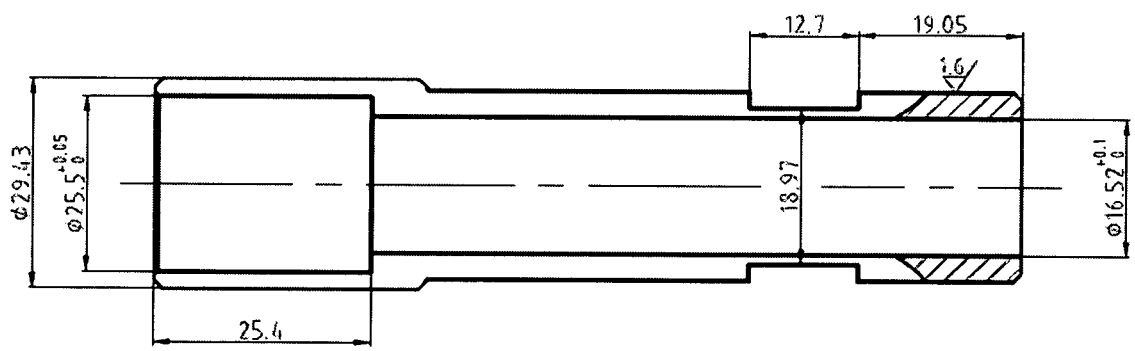
FIG. 12 is a cross sectional view of the guide of FIG. 11 taken along a linear centerline.
Figure 13:
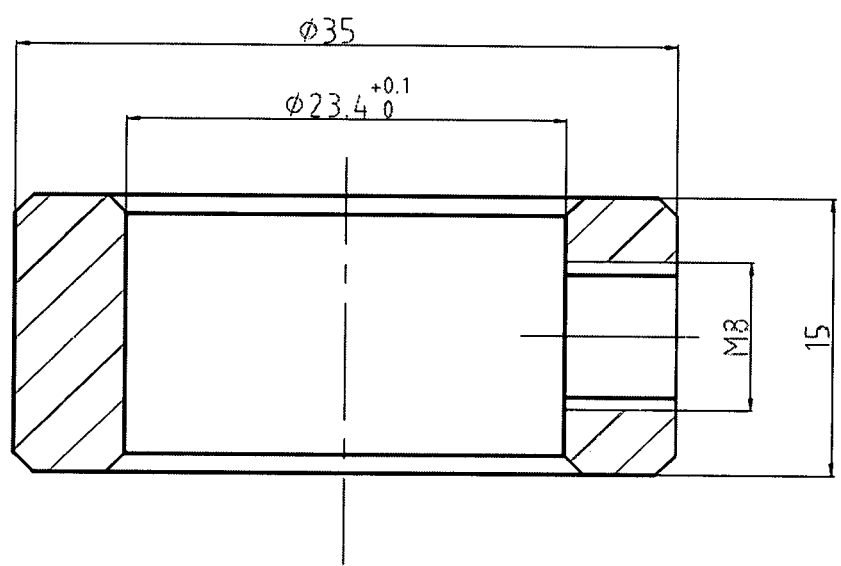
FIG. 13 is a cross sectional view of the a collar 22 taken along a linear centerline according to a first design configuration.
Figure 14:
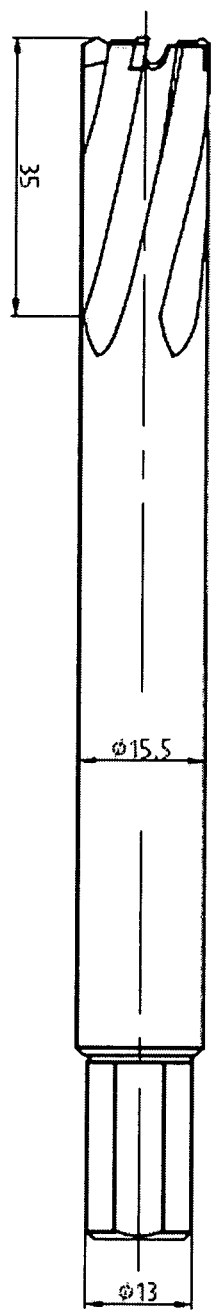
FIG. 14 is a side elevational view of an drill bit 18 for use with the preferred embodiment of the present invention according to a first design configuration.
Figure 15:
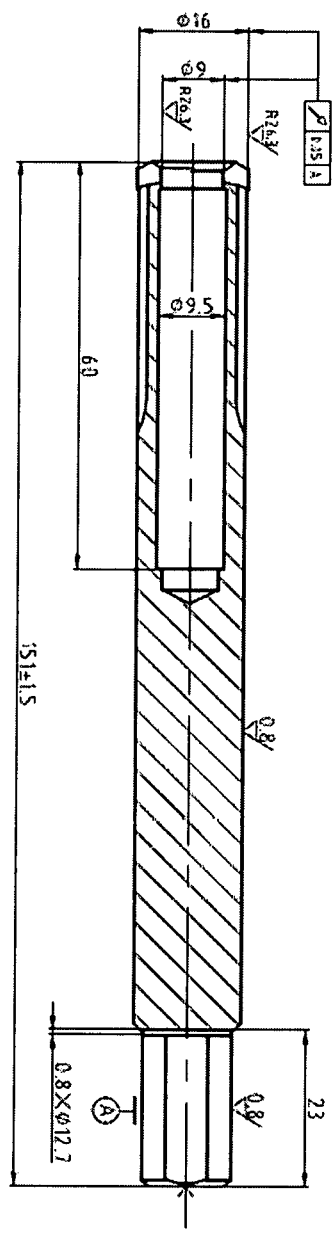
FIG. 15 is a cross sectional view of the drill bit 18 of FIG. 13 taken along a linear centerline.

FIG. 2, FIG. 3 and FIG. 4 show lug nut removal tool 10 in greater detail. Drill bit 18 comprises a plurality of blades 19 separated by slots 23. Blades 19 are mechanically coupled to cutting edges 21. Guide 20 comprises guide slots 26 which can be used to align guide 20 about seized lug nut 14. Drill bit 18 can be inserted linearly along a centerline into guide 20 after guide 20 has been affixed to seized lug nut 14 as noted above. Guide 20 allows a user to precisely bore out seized lug nut 14 by aligning drill bit 19 onto and radially about a seized lug nut 14 in a manner parallel to the centerline. Such guidance allows for precise removal of the lug nut 14 without damaging the attached threaded stud (not shown).

As shown in conjunction with FIG. 5 through FIG. 15, lug nut removal tool 10 is sized for 12 mm threaded studs or 14 mm threaded studs. Lug nut removal tool 10 should be made from tungsten steel with carbide metal welded on cutting bits to be used with low rpm ½ inch air drills. When assembled, lug nut removal tool 10 is 108 mm long. Drill bit 18 is 151 mm long and comprises a 35 mm portion containing blades 19 and cutting edge 21. Drill bit 18 has a shaft that is 16 mm wide. Blades 19 and cutting edge 21 are particularly designed for cutting out the inside of seized lug nut 14. The center of drill bit 18 is hollow with an inner diameter of 9 mm that allows the threaded stud to go inside of drill bit 18 during the drilling process.

The threaded stud will be reduced in size during this process and will need to be replaced. Brill bit 18 comprises a mounting end which is 23 mm long and a 13 mm diameter round shaft that will be inserted into a standard low rpm ½ inch air drill 16. Guide 20 comes in 4 sizes and is adjustable for 12 mm and 14 mm vehicle studs and other various size seized lug nuts 14.

In the preferred embodiment, guide 20 is made out of common steel. Guide 20 comprises a rigid end and an adjustable end. Guide 20 is 101 mm long; the rigid end is 23 mm wide. There are 4 guides with same 101 mm length, 23 mm rigid and 16.52 mm internal diameter measurements. Each guide has different adjustable end measurements to accommodate the 4 most common lug nut sizes in our market place (1=23 mm, 2=25.4 mm, 3=27.4 mm and 4=29.43 mm adjustable ends). The adjustable end is on a side proximate lug nut 14, 23.6 mm to 19.6 mm long on an adjustable internal end. Guide 20 has an external sliding circular collar 22 to close this area down onto the desired size seized lug nut 14. Collar 22 has an internal set screw 24 to adjust guide 20 to the desired size. Guide 20 has an inside an outside.

The outside of guide 20 should be smooth and the inside of guide 20 should have smooth round surface located on the inside to hold onto lug nut 14. There are also 4 mm guide slots 26 cut out of the top and bottom of the guide that starts at the adjustable side. Each guide slot 26 is 65 mm long and 4 mm wide. Guide slot 26 allows lubrication to be added to the top while metal shavings fall out an exit in the bottom during the cutting process.

To use lug nut removal tool 10, a user will simply attach guide 20 onto seized lug nut 14 and tighten guide 20 with set screw 24. Next, the user attaches drill bit 18 onto air drill 16. Then, the user should apply the water constantly through guide slots 26 at the top of guide 20, this must be added during the entire cutting process. Now, you can start cutting by apply constant pressure and monitoring the progress.

Cutting edges 21 will begin to cut the head off seized lug nut 14. The user can remove guide 20 and remove the cap or head of the lug nut. Next, the user can reinstall guide 20 and continue until the stud is reached. Drill bit 18 is designed to cut into the front portion of seized lug nut 14. As seized lug nut 14 is being cut away, the lug nut stud will become exposed. Lug nut removal tool 10 is hollow inside and smaller than the threaded stud. This allows lug nut removal tool 10 to use the threaded stud as a guide. A user will continue to cut into seized lug nut 14 from around the threaded stud until seized lug nut 14 has become hand loose or seized lug nut 14 has been fully bored. Due to the length of the threaded stud, guide 20 may need to be removed for longer boring. After seized lug nut 14 is removed, the rim can be removed, cleaned of debris and the user can inspect the threaded stud for any damage from the stripped lug nut 14. The user can replace the threaded stud if needed.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Provisional Patent Application.

What is claimed is:

1. A lug nut removal tool configured to remove a seized lug nut from around a threaded stud, the lug nut removal tool comprising:
    a generally tubular linearly elongated outer guide adapted for fittingly circumscribing a lug nut head and comprising a generally tubular sidewall terminating at a distal flange and forming guide slots linearly along said sidewall, wherein said guide is adapted in length and diameter to align about the lug nut head of the seized lug nut such that the flange receives the lug nut and an inner diameter of the guide is compressed radially onto the seized lug to secure the guide to the lug nut in a secure manner and parallel about a linear centerline;
    a collar having a set screw secured about said tubular sidewall for compressing the inner diameter of the guide onto the seized lug nut;
    a drill bit capable of being removably inserted through the guide, the drill bit comprising a generally cylindrical shaft forming a cylindrical central cavity which is linearly aligned along the linear centerline and having a plurality of blades separated by slots, each slot being generally collinear with the guide slots and each blade angled in a helical manner and terminates with a cutting edge.

2. The lug nut removal tool of claim 1, wherein said guide further comprises a rigid proximal end and radially adjustable distal end and where said guide slots are formed to allow lubrication to the drill bit and egress of metal shavings.

3. The lug nut removal tool of claim 2, wherein said an inner diameter of the guide and said cylindrical central cavity are capable of receiving and removing a seized lug nut from a 12 mm threaded stud.

4. The lug nut removal tool of claim 3, wherein:
    said lug nut removal tool is approximately 151 mm long; and said drill bit is approximately 151 mm long; and
    said drill bit has a shaft that is 16 mm wide.

5. The lug nut removal tool of claim 2, wherein said an inner diameter of the guide and said cylindrical central cavity are capable of receiving and removing a seized lug nut from a 14 mm threaded stud.

6. The lug nut removal tool of claim 5, wherein:
    said lug nut removal tool is approximately 151 mm long; and said drill bit is approximately 151 mm long; and
    said drill bit has a shaft that is 16 mm wide.

7. The lug nut removal tool of claim 2, wherein each said cutting edge comprises a carbide metal cutting tool.

8. The lug nut removal tool of claim 2, wherein said generally tubular sidewall is used with a ½ inch air drill terminating at a proximal end opposite said distal flange.

9. The lug nut removal tool of claim 1, wherein said an inner diameter of the guide and said cylindrical central cavity are capable of receiving and removing a seized lug nut from a 12 mm threaded stud.

10. The lug nut removal tool of claim 9, wherein:
    said lug nut removal tool is approximately 151 mm long; and said drill bit is approximately 151 mm long; and
    said drill bit has a shaft that is 16 mm wide.

11. The lug nut removal tool of claim 1, wherein said an inner diameter of the guide and said cylindrical central cavity are capable of receiving and removing a seized lug nut from a 14 mm threaded stud.

12. The lug nut removal tool of claim 11, wherein:
    said lug nut removal tool is approximately 151 mm long; and said drill bit is approximately 151 mm long; and
    said drill bit has a shaft that is 16 mm wide.

13. The lug nut removal tool of claim 1, wherein each said cutting edge comprises a carbide metal cutting tool.

14. The lug nut removal tool of claim 1, wherein said generally tubular sidewall may be used with a ½ inch air drill terminating at a proximal end opposite said distal flange.

* * * * *